US008412981B2

(12) United States Patent  (10) Patent No.: US 8,412,981 B2
Munoz et al.  (45) Date of Patent: Apr. 2, 2013

(54) CORE SPARING ON MULTI-CORE PLATFORMS

(75) Inventors: Alberto J. Munoz, Los Altos, CA (US); Sorin Iacobovici, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 11/648,111

(22) Filed: Dec. 29, 2006

(65) Prior Publication Data

US 2008/0163255 A1  Jul. 3, 2008

(51) Int. Cl.
G06F 11/16 (2006.01)
G06F 11/00 (2006.01)

(52) U.S. Cl. ............... 714/12; 714/10; 714/11; 714/13; 714/15

(58) Field of Classification Search .............. 714/10, 714/11, 12, 13, 15
See application file for complete search history.

(56) References Cited

U.S. PATENT DOCUMENTS

| | | | |
|---|---|---|---|
| 5,903,717 A * | 5/1999 | Wardrop | 714/12 |
| 6,336,178 B1 * | 1/2002 | Favor | 712/23 |
| 6,453,427 B2 | 9/2002 | Quach et al. | |
| 6,550,020 B1 * | 4/2003 | Floyd et al. | 714/10 |
| 7,111,196 B2 * | 9/2006 | Balazich et al. | 714/13 |
| 7,185,226 B2 * | 2/2007 | Chen et al. | 714/13 |
| 7,251,746 B2 * | 7/2007 | Fox et al. | 714/13 |
| 7,404,105 B2 * | 7/2008 | Arai | 714/13 |
| 7,412,353 B2 * | 8/2008 | Borkar et al. | 702/186 |
| 7,426,657 B2 * | 9/2008 | Zorek et al. | 714/13 |
| 2003/0125908 A1 * | 7/2003 | Wynn et al. | 702/186 |
| 2003/0154458 A1 * | 8/2003 | Butts et al. | 716/17 |
| 2005/0102565 A1 * | 5/2005 | Barr et al. | 714/25 |
| 2005/0246613 A1 * | 11/2005 | Blaauw et al. | 714/763 |
| 2006/0143515 A1 * | 6/2006 | Kuramkote et al. | 714/15 |
| 2006/0212677 A1 * | 9/2006 | Fossum | 712/1 |

OTHER PUBLICATIONS

Slegel, Timothy J. et al., "IBM's S/390 G5 Microprocessor Design", IEEE 0272-1732/99, 1999, pp. 12-23.

* cited by examiner

Primary Examiner — Joseph D Manoskey
(74) Attorney, Agent, or Firm — Blakely, Sokoloff, Taylor & Zafman LLP

(57) ABSTRACT

Methods and apparatus to provide core sparing on multi-core platforms are described. In an embodiment, stored core state information of a target core (e.g., a core that has detected a fault condition (e.g., within its circuitry) or a request to off-load operations from the target core (e.g., to enable run-time diagnostics without interfering with system software)) may be read by a spare core which is to operationally replace the target core. Other embodiments are also described.

34 Claims, 7 Drawing Sheets

CORE SPARING ON MULTI-CORE PLATFORMS

BACKGROUND

The present disclosure generally relates to the field of electronics. More particularly, an embodiment of the invention relates to techniques for provision of core sparing on computing platforms that utilize multi-core processors.

To improve performance, some processors may include multiple processing cores. Each core may be assigned to perform a set of tasks. During operation, one of the cores may, however, encounter a fault condition, for example, due to damage or degradation of the circuitry within the core. Recovering from such errors may add latency and may further pose security issues when communicating with software elements external to the processor.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" or "micro-operation" (which may be referred to as "uop") herein may be interchangeable.

Some of the embodiments discussed herein may be utilized to provide core sparing on computing platforms that utilize multi-core processors. In one embodiment, "core sparing" may generally refer to the ability to move computation from a target core to a spare core (e.g., which may be present on the same integrated circuit die) at any time, e.g., without requiring system software cooperation. For example, redundancy may be provided at the processor core level or run time diagnostics may be performed, e.g., without interfering with system software. Some embodiments may also be used to aid in thermal management, e.g., where computation is moved from hot spots (cores) to cooler ones. Moreover, some embodiments may enable support for running diagnostics in the field at run time (e.g., while an operating system is running), by replacing the target core with a spare one (transparently to the running software), running diagnostics (and collecting results) on that core, and then replacing it back. Such techniques may enable silicon degradation tracking in the field.

In an embodiment, stored core state information of a target core (e.g., a core that has detected a fault condition (e.g., within its circuitry) or a request to offload operations from the target core (e.g., to enable run-time diagnostics without interfering with system software)) may be read by a spare core which is to operationally replace the target core. In one embodiment, the core state information may be stored in a memory (which may be dedicated to the target core) upon occurrence of a core sparing event that corresponds to the detection of a fault condition within the target core or a request to offload operations from the target core. Such techniques may allow for improved performance and/or reliability in various computing systems, such as the computing systems discussed with reference to FIGS. 1 and 6-7.

Figure 1:
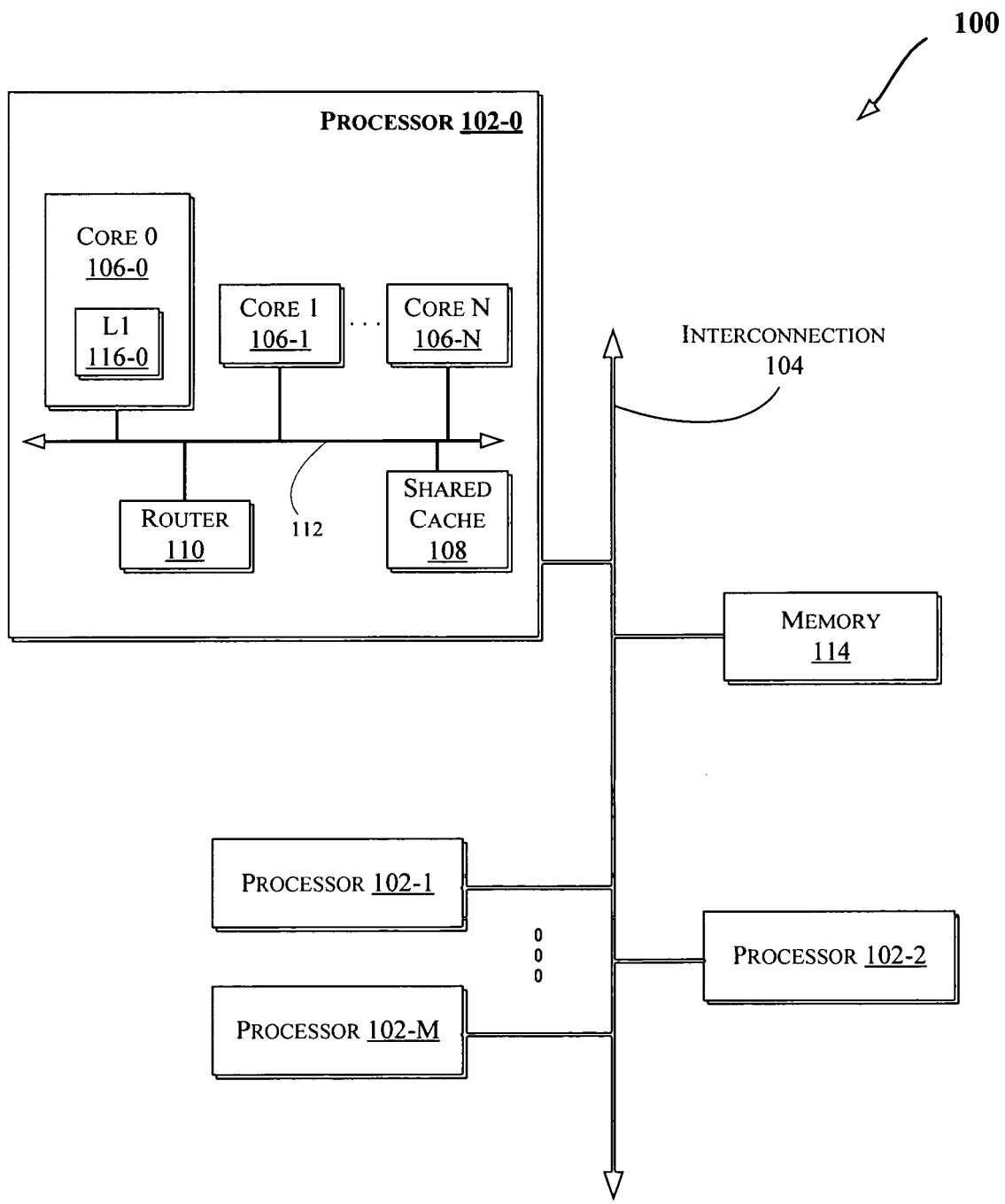
FIGS. 1, 6, and 7 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more processors 102-0 through 102-M (collectively referred to herein as "processors 102" or more generally "processor 102"). The processors 102 may communicate via an interconnection network or bus 104. Each processor may include various components, some of which are only discussed with reference to processor 102-0 for clarity. Accordingly, each of the remaining processors 102-0 through 102-M may include the same or similar components discussed with reference to the processor 102-0.

In an embodiment, the processor 102-0 may include one or more processor cores 106-0 through 106-N (collectively referred to herein as "cores 106" or more generally "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 6 and 7), or other components.

In one embodiment, the router 110 may be used to communicate between various components of the processor 102-0 and/or system 100. Moreover, the processor 102-0 may include more than one router 110. Furthermore, the multitude of routers (110) may be in communication to enable data routing between various components inside or outside of the processor 102-0.

The shared cache 108 may store data (e.g., including instructions) that are utilized by one or more components of the processor 102-0, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-0 may communicate with the shared cache 108 directly, through a bus (e.g., the bus 112), and/or a memory controller or hub. As shown in FIG. 1, in some embodiments, one or more of the cores 106 may include a level 1 (L1) cache (116-0) (collectively referred to herein as "cache 116") or other levels of cache such as L2.

Figure 2:
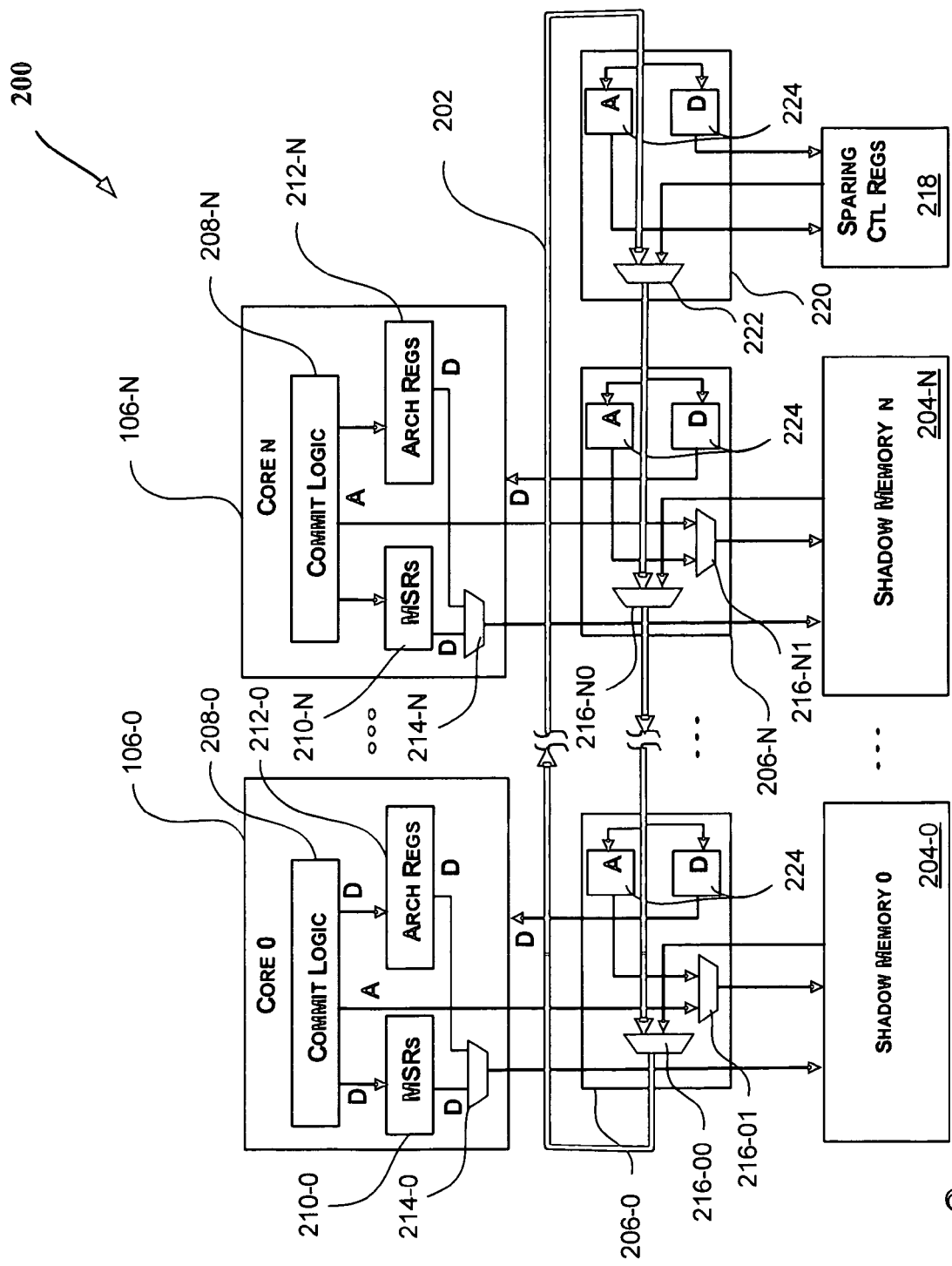
FIGS. 2-4 illustrate block diagrams of portions of a multi-core processor, according to some embodiments of the invention.

FIG. 2 illustrates a block diagram of portions of a multi-core processor 200, according to an embodiment of the invention. In one embodiment, the processor 200 may be the same or similar to processors 102 of FIG. 1. Moreover, the processor 200 may include one or more processor cores (such as the processor cores 106) and an interconnection 202 (which may be configured as a ring in an embodiment) to enable communication between the cores 106 and corresponding shadow memory units 204-0 through 204-N (collectively referred to herein as "memories 204" or more generally "memory 204"). In an embodiment, the shadow memories 204 may be stored in a private or shared cache (e.g., cache 116 and/or shared cache 108 of FIG. 1). The processor 200 may further include switching logics 206-0 through 206-N to facilitate communication between the cores 106 and the shadow memories 204. In an embodiment, only one of the cores 106 may obtain access (e.g., through the switching logics 206 and/or interconnection 202) to a corresponding shadow memory 206. For example, the cores 106 and/or switching logics 206 may include logic to determine which core is granted read or write access to a select one of the shadow memories 204. In some embodiments, each of the cores 106 may have write access to its assigned shadow memory 204 (e.g., which may be local to that core in an embodiment), while a core in core sparing mode may have access to a different core's shadow memory. Such implementations may reduce security issues which may be associated with communicating with software or hardware elements external to the processor 200.

Furthermore, as shown in FIG. 2, there may be one shadow memory 204 per each core 106. The shadow memory 204 may store the state of each individual core 106. As will be further discussed herein, e.g., with reference to FIGS. 3-5, in some embodiments, there may be two ways of accessing the shadow memory 204: (1) locally from the core that owns that shadow memory (e.g., the owner core may use this mechanism for saving the core state to the shadow memory); or (2) remotely through the interconnect 202 (e.g., a core in sparing mode may access shadow memory using this mechanism in order to read a remote core's state).

In some embodiments, each of the processor cores 106 may include various units to fetch instructions, optionally decode instructions (e.g., into micro-operations or "uops"), schedule/dispatch instructions, and execute instructions (not shown). As shown in FIG. 2, the cores 106 may include commit logics 208-0 through 208-N (collectively referred to herein as "logics 208" or more generally "logic 208") to commit and/or retire instructions that have been executed. In an embodiment, commitment/retirement of the executed instructions may result in processor state being committed from the execution of the instructions, physical registers used by the instructions being de-allocated, etc. Further, the commit logic 208-0 through 208-N may respectively copy the contents of the machine specific registers (MSRs) 210-0 through 210-N (collectively referred to herein as "registers 210" or more generally "register 210") and/or architectural registers 212-0 through 212-N (collectively referred to herein as "registers 212" or more generally "register 212") upon occurrence of a core sparing event, as will be further discussed herein, e.g., with reference to FIGS. 3-5. In some embodiments, the MSRs and architectural registers are shown as separated in FIG. 2, in part, because MSRs tend not to change as often as the architectural registers (e.g., they may change just once at boot time), which allows for an optimization in which the MSRs are copied to the respective shadow memory 204 as they are modified (and not after a core sparing event occurs). This approach may reduce the amount of state that needs to be placed in shadow memory after a core sparing event occurs.

As shown in FIG. 2, the registers 210 and 212 may communicate with switching logic 206 through multiplexers 214-0 through 214-N (collectively referred to herein as "multiplexers 214" or more generally "multiplexer 214"). As shown in FIG. 2, the switching logics 206 may also include multiplexers 216-00 and 216-01 through 216-N0 and 216-N1 to facilitate data communication between the commit logics 208 and the memories 204. The processor 200 may additionally include sparing control registers 218 (e.g., to assist in the core sparing operations as will be further discussed herein, e.g., with reference to FIG. 3) and switching logic 220. The switching logic 220 may include a multiplexer 222 to facilitate communication between the registers 218 and the interconnection 202. Also, as shown in FIG. 2, separate address (indicated by "A") and data (indicated by "D") paths (e.g. through latches 224) may be utilized to communicate between the components of processor 200.

Figure 3:
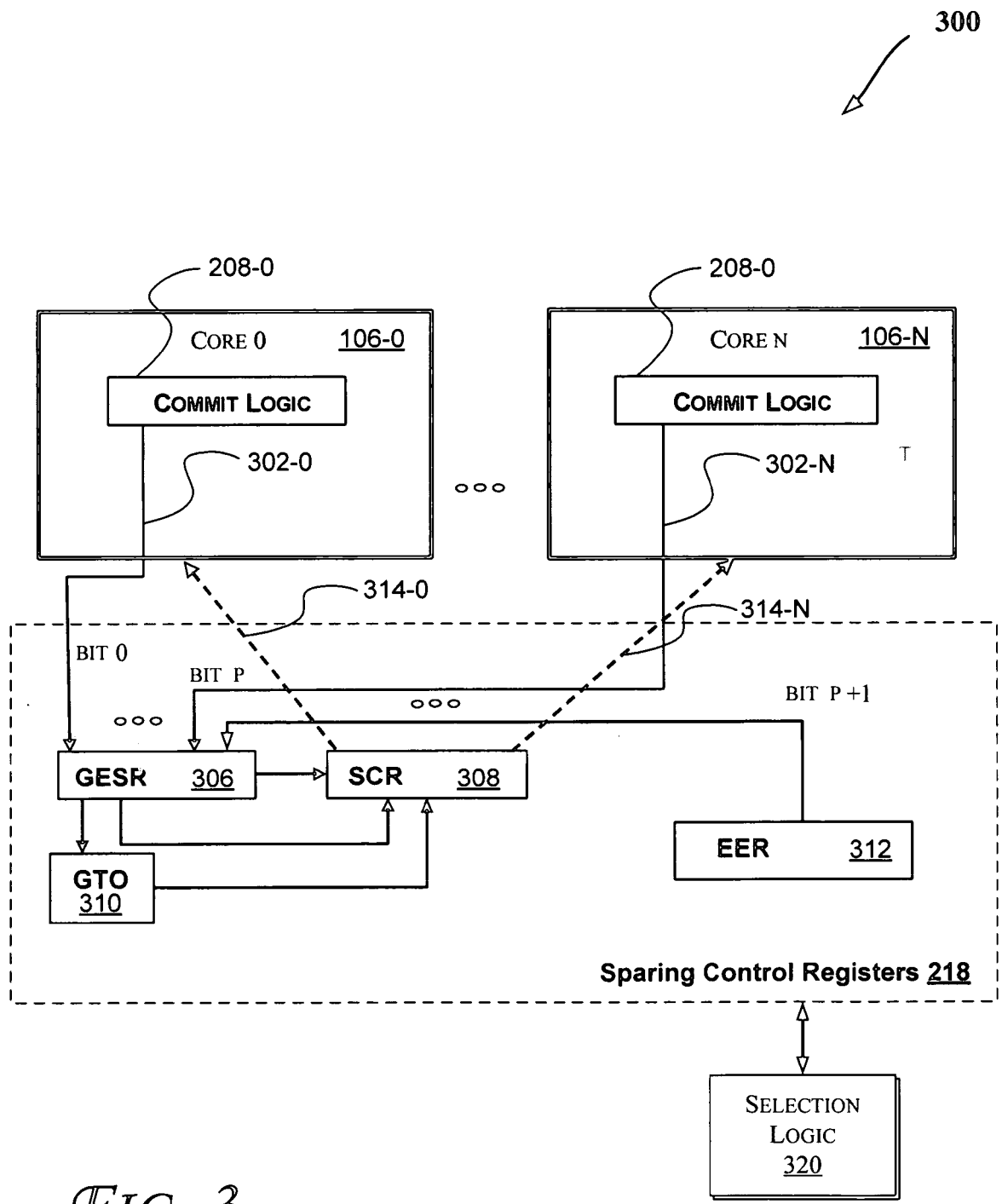

FIG. 3 illustrates a block diagram of portions of a multi-core processor 300, according to an embodiment of the invention. In one embodiment, the processor 300 may be the same or similar to processors 102 of FIG. 1 or the processor 200 of FIG. 2. Moreover, the processor 300 may include one or more processor cores (such as the processor cores 106). The cores 106 may include the commit logics 208 to generate core sparing signals 302-0 through 302-N (collectively referred to herein as "signals 302" or more generally "signal 302") to indicate occurrence of a core sparing event.

In some embodiments, the core sparing event may occur in response to detecting a fault condition (e.g., within the circuitry of the corresponding target processor core) or a request to offload operations from the target core (e.g., to enable run-time diagnostics without interfering with system software). In some embodiments, the request may be generated by the spare core or another core (which may or may not be on the same integrated circuit die or processor as the target or spare processor core). Core sparing events caused by external requests may be provided to support on demand core sparing. On demand core sparing may be useful for diagnosis purposes (where a core is freed up through core sparing in order to run diagnostics tests on it), or for thermal management (e.g., when the target core's temperature has exceeded a threshold amount), in which case computation may be moved from hot cores to cool cores in order to spread heat evenly through the die (this functionality may also be referred to as "core hopping").

As illustrated in FIG. 3, the processor 300 may also include one or more registers 306-312 to enable core sparing operations. In an embodiment, the control registers 218 may include the registers 306-312. As discussed herein, certain bits of the registers 306-312 may be set or cleared. However, depending on the implementation, the setting or clearing of the bits may be reversed. More particularly, the global error sparing register (GESR) 306 may be used to keep track of core sparing events and/or to initiate the core sparing process. In one embodiment, there is one bit in this register per core on the die and one additional bit used to support a diagnosis infrastructure. A core sparing event may cause the bit in the GESR 306 corresponding to the core to be spared (the target core) to become set. This, in turn, may cause the core selection process to begin. The GESR 306 may be read by the core sparing logic (which may be implemented through a firmware in an embodiment) to identify the core to be spared. As is it possible for more than one core sparing event to occur at roughly the same time (e.g., where a second event occurs before core sparing has been completed for the first event), a second core sparing process may not be initiated until the first core sparing process has been completed. This means that when the GESR 306 is read, if there is more than one bit set, the core sparing process may be initiated for one of these cores (e.g., the most significant bit set). Once the sparing process has been completed, the corresponding bit in the GESR 306 may be cleared. Once this is done, if there are other bits set in the GESR 306, then a new sparing process may be initiated.

In some embodiments, the GESR 306 may include one additional bit that may be set externally (to the die) by writing to the external event register (EER) 312. When this bit is set, the spare core selection may occur normally, but the spare core may not perform core sparing. Instead it invokes a function used to support diagnostics. Moreover, a core in sparing mode may have the ability to set any bits in the GESR 306. This may cause a core sparing event (that will as a result cause the core represented by the set bit to be spared) when the spare core clears the original bit that caused its invocation. This functionality may be used to support on demand core sparing.

Additionally, a spare core register 308 (SCR) may keep track of spare cores. For example, a bit set (e.g., to 1) in the SCR 308 may indicate that the corresponding core is a spare core. When a sparing event occurs (a bit in the GESR 306 may be set and no sparing process is occurring, or when a bit in the GESR 306 is cleared and there are additional bits set), one of the cores may be marked as spare in the SCR 308 (e.g., by picking the most significant set bit in an embodiment). In some embodiments, the SCR 308 may be written by core sparing configuration firmware at system boot time. Individual bits may be cleared (e.g., by the core sparing firmware) as part of completing the core sparing process. In some embodiments, bits in the SCR 308 may be set at run time. Such implementations may involve the temporary replacement of a core for diagnosis purposes.

Furthermore, a global timeout register (GTO) 310 may be utilized to implement a recovery mechanism when the core sparing process fails. For example, the GTO 310 may be a timer that is started at the beginning of the sparing process. Setting any bit in the GESR 306 may cause the GTO 310 to start counting. In turn, clearing a bit in the GESR 306 may reset the GTO 310 count back to 0. Moreover, clearing the last bit set in the GESR 306 (all bits in the GESR are 0) may reset the counter back to zero and disables the count (until the next core sparing event occurs). In an embodiment, in order to complete the core sparing process, the last thing the spare core does (before restoring the state of the target core) may be to clear the GESR 306 bit for the core being replaced. If the GTO 310 expires (e.g., pops), it may be assumed that the spare core failed before completing the sparing process, and a new spare core may be selected as a result. In one embodiment, expiration of the GTO 310 may cause the clearing the most significant SCR 308 bit (that represents the previously selected spare core, which has failed). Clearing this bit may also cause a new sparing signal (if any bits in the GESR 306 are set) and this causes the selection (and wake up) of the next available spare core (e.g., based in the content of the SCR 308). In an embodiment, the length of the time out in the GTO 310 may be programmable by a core in core sparing mode. Also, programming of the timer may occur at system boot time in an embodiment.

As shown in FIG. 3, the processor 300 may include an external event register (EER) 312. The EER 312 may be used to cause a core sparing event from outside the die (this register may be made accessible outside the die), e.g., by another processor or processor core that is executing an instruction to cause on demand core sparing. In an embodiment, a write operation to the EER 312 may cause bit n (where n is the number of cores in the die) in the GESR 306 to be set (assuming bit 0 represents the first core in the die). This may in turn cause initiation of the spare core selection. When the selected spare core reads the GESR 306 to identify the core to be replaced, if bit n is set, then the spare core may invoke the diagnostics support function instead of continuing with the core sparing process.

In some embodiments, when a sparing event occurs (e.g., a bit in the GESR 306 is set), one of the cores marked as spare in the SCR 308 may be selected as the spare core. Selecting a spare core may be performed by sending that core a signal (314-0 through 314-N, respectively, which may be collectively referred to here as "signal 314" or more generally "signal 314") to put that core in a core sparing mode. In some embodiment, one or more of the cores 106 may be in a lower power consumption state (which may be referred to as a "sleep mode" or a "hibernation" mode) if not in use. For example, information that describes the state of a core at a given point in time may be stored to a shared storage unit before reducing the voltage in that core below state retention levels. In such embodiments, the signal 314 may wake the recipient core from its lower power consumption mode. In an embodiment, the signal 314 may remain asserted (and the receiving core may stay in core sparing mode) as long as the corresponding bit in the SCR 308 and the GESR 306 are set. In one embodiment, only one core on the same die (e.g., one of the cores 106 in processor 300) may be in core sparing mode at a given time. Detecting a second sparing event while the first one is being handled may result in queuing (or masking) of the second sparing process until the first one completes (where completion may be indicated by clearing the GESR 306 bit corresponding to the target core).

In one embodiment, the processor 300 may include a selection logic 320 that may access the registers 306-312 to select a spare core such as discussed with reference to FIG. 3. Moreover, the selection logic 320 may generate the signal 314 in an embodiment. Also, in one embodiment, the selection logic 320 may be provided in the switching logic 220.

Figure 4:
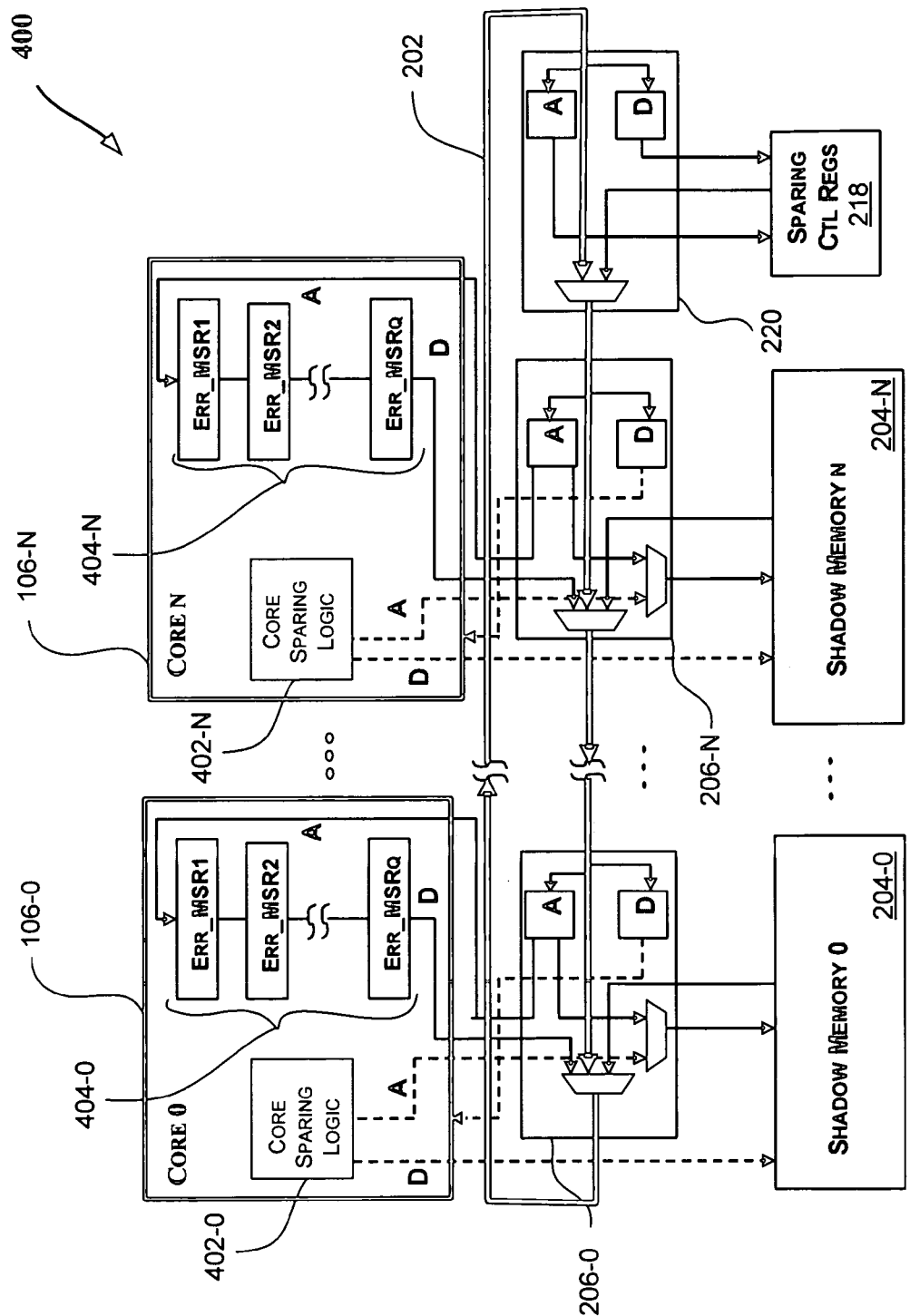

FIG. 4 illustrates a block diagram of portions of a multi-core processor 400, according to an embodiment of the invention. In one embodiment, the processor 400 may be the same or similar to processors 102 of FIG. 1 or the processors 200 of FIG. 2 or 300 of FIG. 3. Moreover, the processor 400 may include one or more processor cores (such as the processor cores 106). The cores 106 may include a core sparing logic (402-0 through 402-N respectively, collectively referred to herein as "logics 402" or more generally "logic 402") to cause storage of state information to the shadow memories 204 directly or through the switching logics 206 and/or interconnection 202. In an embodiment, the cores 106 of FIGS. 2 and/or 3 may also include the core sparing logics 402.

Furthermore, each of the cores 106 may include one or more error logging MSRs (404-0 through 404-N respectively, collectively referred to herein as "MSRs 404" or more generally "MSR 404"). In some embodiments, access to error MSRs 404 may be used for diagnostics purposes and/or to support platform monitoring functionality (e.g., fault prediction). For example, the MSRs 404 may be accessed remotely (by another processor or processor core external to the processor 400, e.g., on a separated die).

As shown in FIG. 4, the interconnect 202 may couple the error logging MSRs 404 with other components of the processor 400 to provide the ability to read these MSRs from outside the respective core 106. For example, a spare core (in core sparing mode) may pull the error MSRs directly from the target core using the interconnect 202. In some embodiments, a separate interconnect may be used to communicate the content of the error MSRs 404 than the interconnect that facilitates communication between the cores 106 and shadow memories 204 discussed with reference to FIG. 2. Alternatively, a single interconnect may be used for both of these purposes.

Figure 5:
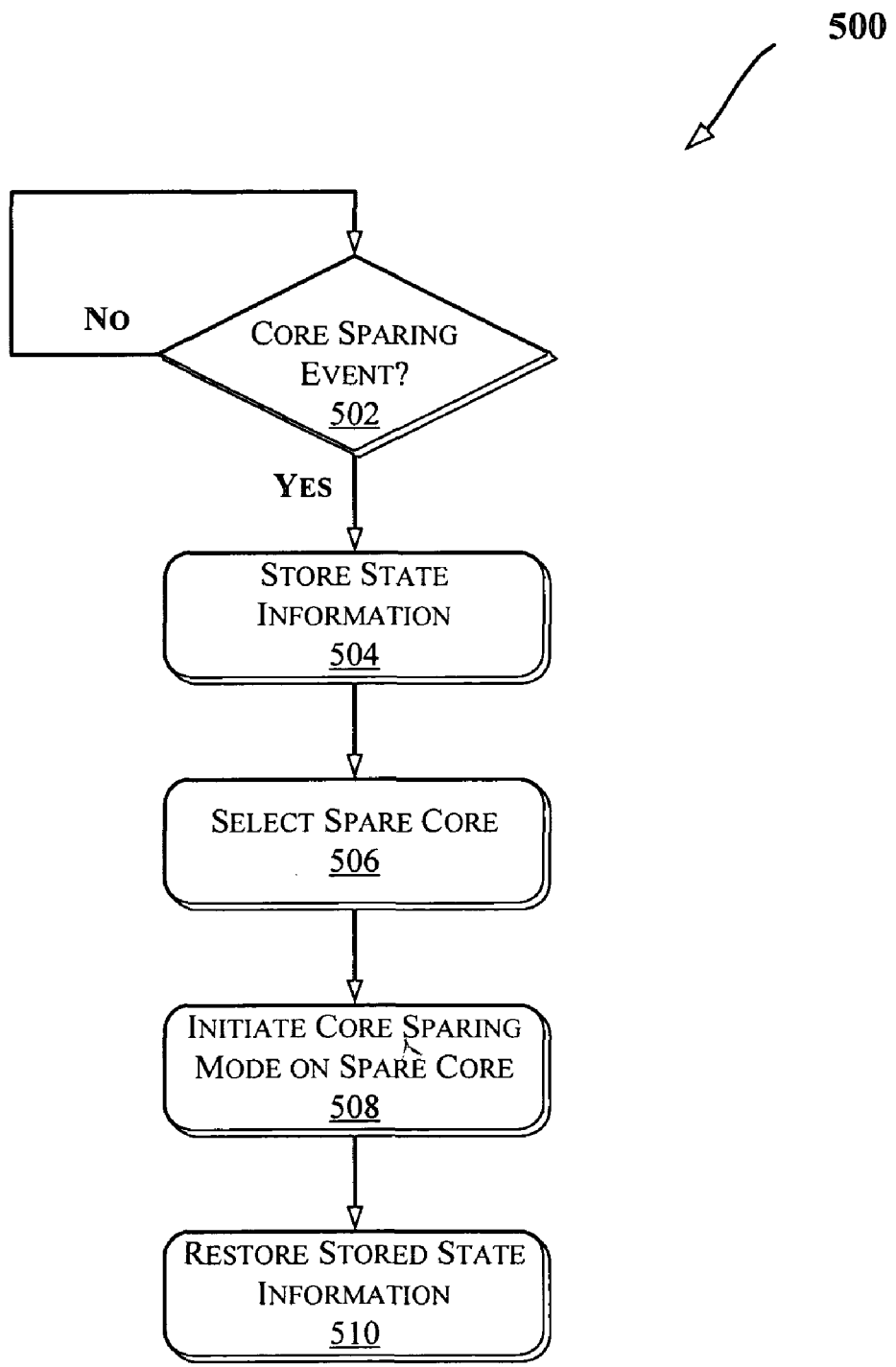
FIG. 5 illustrates a flow diagram of a method in accordance with an embodiment of the invention.

FIG. 5 illustrates a flow diagram of a method 500 to perform core sparing, according to an embodiment of the invention. In some embodiments, various components discussed with reference to FIGS. 1-4 and 6-7 may be utilized to perform one or more of the operations discussed with reference to FIG. 5.

Referring to FIGS. 1-5, at an operation 502, it is detected (e.g., by the commit logic 208) whether a core sparing event has occurred (such as discussed with reference to FIGS. 1-4). Upon occurrence or detection of the core sparing event, the state information of a target processor core may be stored (e.g., in the corresponding shadow memory 204) at an operation 504. The state information may describe the computational operations occurring in a core at a given point in time. Core sparing requires that the entire state of the target core be saved (written) to a shadow memory, where it is available to the spare core at the time of a core sparing event (or shortly after). The core state tends to have a large component that is implementation specific. This document describes a high level set of registers without getting into detail as to which registers are available in which implementations.

For example the state information stored at operation 504 may include:

(1) Architectural state—This state may includes all state that is typically accessible to software. This information may include the different register files (integer, floating point, streaming single instruction-stream, multiple data-stream (SIMD) extensions (SSE), etc.), architecture control registers (CRs), and other registers (such as enhanced instruction pointer (EIP), EFLAGS, task registers, segment registers, Global Descriptor Table Register (GDTR), Local Descriptor Table Register (LDTR), Interrupt Descriptor Table Register (IDTR), etc.);

(2) Micro-Architectural state—This information may includes state that is specific to a given micro-architecture; and/or (3) Error logging state—This state may includes all of the error MSRs 404. In an embodiment, this state may not be critical for core sparing, as it does not need to be restored in the spare core. Nonetheless, the core sparing functionality may be leveraged to provide out of band access to this state. This may be important for fault prediction and other platform monitoring activities that would have to contend with system software for access to this state.

In some embodiments, the state information of a core may be divided into two parts, based on how often the parts are updated. For example, the part that is updated often (e.g., almost at every instruction retirement), which may be referred to as "dynamic state" (e.g., the architectural state) and the part that changes less often, which may be referred to as "semi-static state" (e.g., information stored in the MSRs 404). In order to minimize the amount of time it takes to achieve core sparing, an embodiment may push the dynamic state to shadow memory after a sparing event at operation 504. The semi-static state may be stored in shadow memory as the updates to that state occur (e.g., as detected by the commits logic 208). Such implementations may allow for reduction in the amount of state information that needs to be extracted from the target core after a core sparing event occurs. Furthermore, in some embodiments, the decision to push the state information out to shadow memory 204 may be made by the commit logic 208 in the core, e.g., either because the instruction being retired is updating semi-static state or because there has been a core sparing event and the dynamic state needs to be pushed out. In an embodiment, the update mechanism for the error logging state may be different as that state may not become updated through the normal commit logic 208.

At an operation 506, a spare core may be selected, e.g., by the selection logic 320 such as discussed with reference to FIG. 3. In an embodiment, the operation 506 may be performed after operation 502, i.e., once a core sparing event occurs. At an operation 508, core sparing mode may be initiated for a spare core (e.g., signal 314 may be asserted for a selected spare core by the selection logic 320). For example, the selected spare core of operation 506 may determine which core is to be replaced by reading the core sparing control registers 218. At an operation 510, all or some of the state information stored at operation 504 may be restored to the selected spare core of operation 506. In an embodiment, after the spare core may be put in the core sparing mode (e.g., through assertion of the corresponding signal 314) at operation 508, data stored in the shadow memory 204 of the target core may become accessible to the spare core and subsequently read by the spare core at operation 510. For example, placing the spare core in the special mode (which is referred to herein as "core sparing mode") may allow the spare core to access resources through the interconnect 202, including the shadow memory 204 and the core sparing control registers 218. Additionally, at operation 510 (or thereafter), the spare core may reconfigure the die to assume the identity of the target core. Moreover, the spare core may optionally cause diagnostics to be run on the target core, e.g., to determine the cause for a fault condition that may have triggered the core sparing event at operation 502.

In an embodiment, at operation 508, software may be fetched into the selected spare core of operation 506 to perform one or more of core sparing operations. For example, the following pseudo code may be fetched from memory (e.g., memory 114 of FIG. 1 or the cache 108 of FIG. 1):

```
Triggering Event: Asserting Spr_i    /* Spr_i refers to the signal 314
/*
 * In an embodiment, this code may perform all of the ground work of
 * preparing the spare core to perform core sparing (e.g., fetching code,
 *   initializing resources, etc.) at boot/system initialization time and then
 the spare core may enter lower power consumption state
 */
Wake up from lower power consumption state /* This may be a direct
result of asserting Spr_i */
if (failed_core = get_set_msb_GESR()) {
   if (failed_core == n) { /* on demand diagnosis event */
      Invoke diagnosis handling function
   } else /* Core sparing event */
      if (read_core_state_from_shadow_mem(failed_core)) {
         /*
          * In an embodiment, the reconfiguration state is
          * idempotent. In other words, if there is a failure of this core
          * between this point and the clearing of GESR, then the next
          * spare core will be able to reconfigure the platform
          * regardless of how far between here and clearing GESR the
          * original spare core got
          */
         reconfigure_platform(this_core, failed_core)
         /*
          * In order to avoid some races, multiple operations may be
          * performed atomically as a result of software clearing a bit
          *in GESR (clear the most significant bit (msb)
          * in SCR 308, de-assert * Spr_i, and reset GTO 310)
          */
         if (!read_and_clear_GESR_bit(failed_core)) {
            /* Spr_i has been de-asserted by GTO popping */
            goto back to lower power consumption state
         }
         /*
```

```
    * At this point this core is no longer in core sparing mode. Its
    * failure will be picked up by the core sparing mechanism.
    */
    load_failed_core_state_and_execute()
    /* A return from the above call may mean that the spare core
    * failed to assume the identity of the target core. At this
    * point, all the system can do is broadcast an MCA (Machine
    * Check Abort) as an indication of the failure */
    Broadcast MCA to hardware domain
  }
 }
}
```

Figure 6:
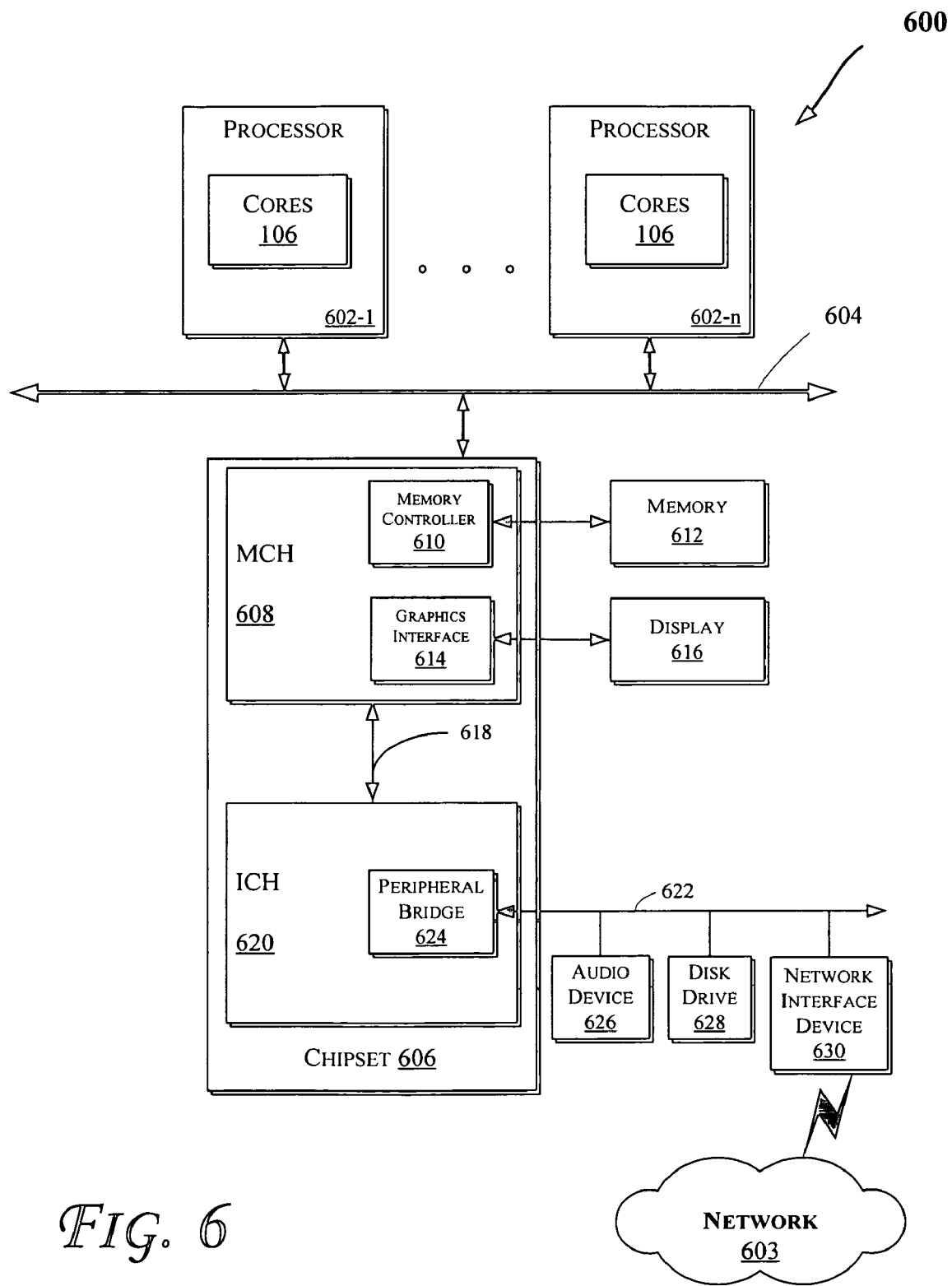

FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include one or more of the cores 106. Also, the operations discussed with reference to FIGS. 1-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 114 of FIG. 1). The memory 612 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and the MCH 608 may be combined to form a single chip. Furthermore, a graphics accelerator may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
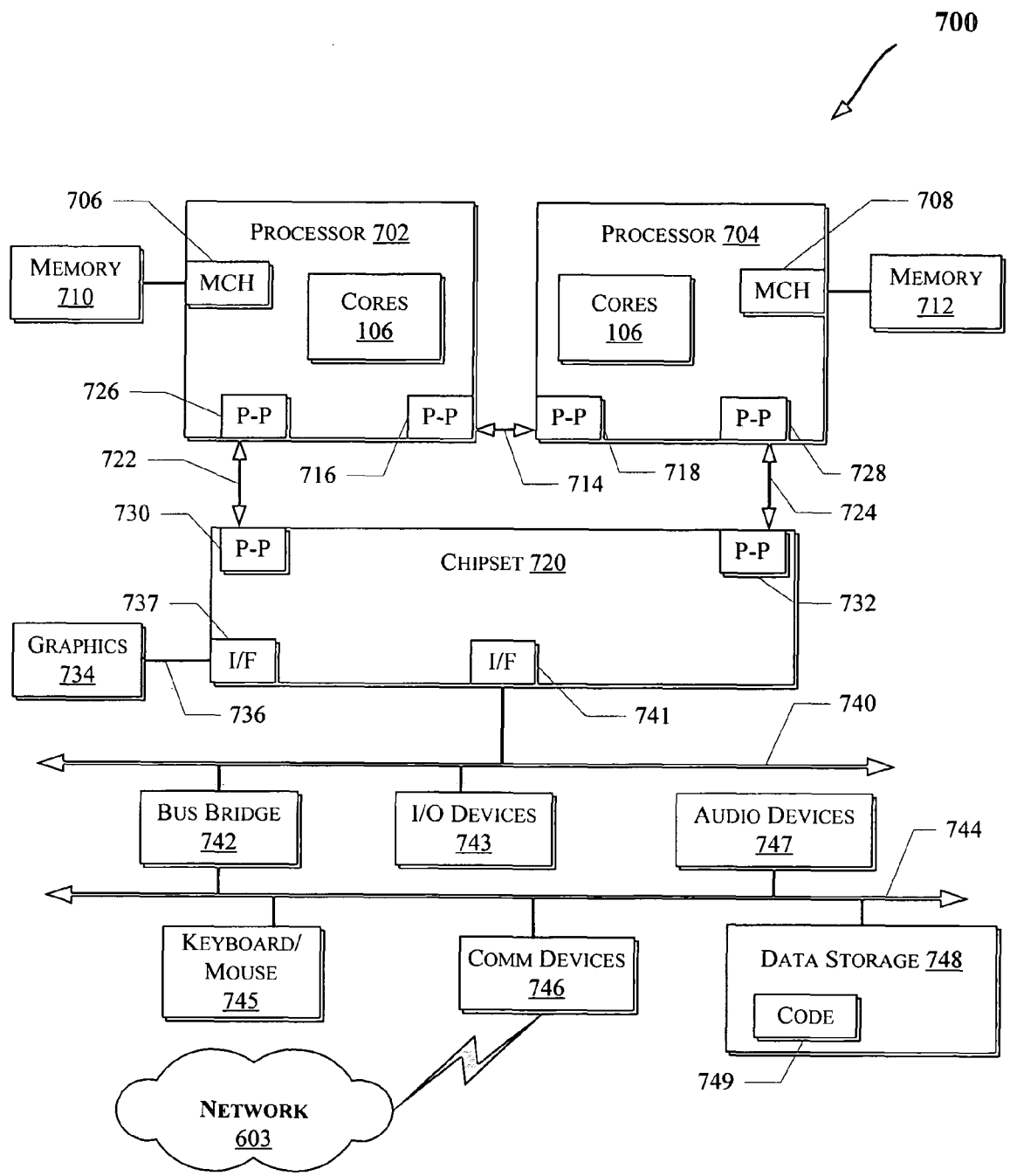

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6.

In an embodiment, the processors 702 and 704 may be one of the processors 502 discussed with reference to FIGS. 1-5. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a graphics circuit 734 via a graphics interface 736, e.g., using a PtP interface circuit 737.

At least one embodiment of the invention may be provided within the processors 702 and 704. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with a bus 740 using a PtP interface circuit 741. The bus 740 may communicate with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device 747, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
    first logic circuitry to cause architectural state information of a first processor core to be stored to a shadow memory in response to an occurrence of a core sparing event;
    second logic circuitry to cause error logging state information of said first processor core to be stored to said shadow memory; and,
    third logic circuitry to select a second processor core to read at least the stored architectural state information in response to the occurrence of the core sparing event.

2. The processor of claim 1, wherein the core sparing event is to occur in response to a fault condition generated within the first processor core.

3. The processor of, claim 1, wherein the second processor core is to read the stored architectural state information from the shadow memory in response to an indication that the second processor core is selected to replace the first processor core.

4. The processor of claim 1, wherein the error logging state information is stored into the shadow memory from a machine specific register of the first processor core.

5. The processor of claim 1, further comprising a fourth logic circuitry to allow access to the shadow memory by the second processor core in response to an indication that the second processor core is selected to replace the first processor core.

6. The processor of claim 5, wherein the fourth logic circuitry is to disallow access to the shadow memory by processor cores other than the second processor core.

7. The processor of claim 1, further comprising one or more hardware registers to store one or more bits to indicate one or more of: an occurrence of the core sparing event, available spare cores, failure of a core sparing event, or an external core sparing event request.

8. The processor of claim 1, further comprising switching logic to couple the shadow memory to the first and second processor cores.

9. The processor of claim 8, wherein the shadow memory comprises at least a portion of one or more of a private cache and a shared cache.

10. The processor of claim 8, wherein the shadow memory comprises a portion of one or more of a level 1 cache, a mid-level cache, or a last level cache.

11. The processor of claim 8, wherein the switching logic is to comprise a plurality of latches to respectively store address and data information.

12. The processor of claim 8, wherein the switching logic is to comprise a plurality of switching logic circuits, each corresponding to a processor core, wherein the plurality of switching logic circuits are to each comprise a multiplexer to communicate address and data information amongst the shadow memory, one or more of the plurality of switching logic circuits, the first processor core, or second processor core.

13. The processor of claim 1, wherein one or more of the first processor core, the first logic, the second logic, the storage unit, or the second processor core are on a same integrated circuit chip.

14. The processor of claim 1, wherein the second logic circuitry is to store the error logging state information from one or more machine specific registers of the first processor core into the shadow memory in response to the occurrence of the core sparing event.

15. The apparatus of claim 14, further comprising a fourth logic circuitry to grant the third logic circuitry access to the one or more machine specific registers.

16. The processor of claim 1, wherein the core sparing event is to occur in response to a request to offload one or more operations from the first processor core, and wherein the request to offload is to occur to allow for execution of a diagnostic test.

17. The processor of claim 1, wherein a request to offload is to occur in response to a temperature of the first processor core exceeding a threshold value.

18. The processor of claim 1, wherein each processor core of the processor is to have access to a corresponding shadow memory to store micro-architectural state information of that processor core.

19. The processor of claim 1, wherein the second processor core is to enter a core sparing mode to allow the second processor core to access the stored state information of the first processor core that is not otherwise accessible by the second processor core.

20. The processor of claim 1, wherein the second processor core is to reconfigure a die, comprising the first processor core and the second processor core, to assume identity of the first processor core.

21. The processor of claim 1, further comprising a register to store a bit per processor core to indicate the first processor core is to be replaced, wherein the second logic is to select the second processor core based on a value of the bit.

22. A method, comprising:
storing error logging state information of a first processor core into a machine specific register of said first processor core;
detecting an occurrence of a core sparing event concerning said first processor core;
storing architectural state of said first processor core in a shadow memory in response to the occurrence of the core sparing event;
storing said error logging state information of said first processor core into said shadow memory; and
selecting a second processor core as a spare core to replace the first processor core.

23. The method of claim 22, further comprising restoring the stored architectural state information to the second processor core.

24. The method of claim 22, further comprising disallowing access to the storage unit by processor cores other than the second processor core.

25. A computing system comprising:
a plurality of processor cores of a processor
a memory to store a plurality of instructions;
the processor to fetch the instructions from the memory and execute them to operationally replace a first processor core of the plurality of processor cores with a second processor core of the plurality of processor cores, where, the first processor core comprises:
first logic circuitry to cause architectural state information of the first processor core to be stored to a shadow memory in response to an occurrence of a core sparing event;
second logic circuitry to cause error logging state information of said first processor core to be stored to said shadow memory; and,
third logic circuitry to select a second processor core to read at least the stored architectural state information in response to the occurrence of the core sparing event.

26. The system of claim 25, wherein the core sparing event is to occur in response to one or more of a fault condition generated by the first processor core or a request to offload, operations from the first processor core.

27. The system of claim 26, wherein the request is to be generated by the second processor core or a second processor.

28. The system of claim 27, wherein the second processor is on a different integrated circuit chip than the first processor core and the second processor core.

29. The system of claim 27, wherein the processor and the second processor are on a same integrated circuit chip.

30. The system of claim 27, wherein the second processor comprises a plurality of processor cores.

31. The system of claim 25, further comprising fourth logic circuitry to allow access to the shadow memory by the second processor core in response to an indication that the second processor core is selected to replace the first processor core.

32. The system of claim 31, wherein the fourth logic circuitry is to disallow access to the shadow memory by processor cores other than the second processor core.

33. The system of claim 25, further comprising one or more hardware registers to store one or more bits to indicate one or more of: an occurrence of the core sparing event, available spare cores, failure of a core sparing event, or an external core sparing event request.

34. The system of claim 25, further comprising an audio device coupled to the processor.

* * * * *